US008244260B2

(12) United States Patent
Silverstrim et al.

(10) Patent No.: US 8,244,260 B2
(45) Date of Patent: Aug. 14, 2012

(54) METHOD AND APPARATUS FOR MANAGEMENT OF A GLOBAL WIRELESS SENSOR NETWORK

(75) Inventors: James E. Silverstrim, Forest, VA (US); W. Eric Holland, Lynchburg, VA (US); Luke Koleszar, Lynchburg, VA (US); Paul Carpenter, Lynchburg, VA (US)

(73) Assignee: Innovative Wireless Technologies, Inc., Forest, VA (US)

( * ) Notice: Subject to any disclaimer, the term of this patent is extended or adjusted under 35 U.S.C. 154(b) by 0 days.

(21) Appl. No.: 13/156,375

(22) Filed: Jun. 9, 2011

(65) Prior Publication Data
US 2011/0280154 A1    Nov. 17, 2011

Related U.S. Application Data

(62) Division of application No. 11/687,030, filed on Mar. 16, 2007, now Pat. No. 7,983,685.

(60) Provisional application No. 60/869,076, filed on Dec. 7, 2006.

(51) Int. Cl.
*H04W 40/00* (2009.01)
(52) U.S. Cl. ........ 455/447; 455/449; 455/450; 455/423; 370/328; 370/338
(58) Field of Classification Search .................. 455/446, 455/450, 423; 370/328, 338
See application file for complete search history.

(56) References Cited

U.S. PATENT DOCUMENTS

| 6,181,734 | B1 | 1/2001 | Palermo |
| 6,584,146 | B2 | 6/2003 | Bose et al. |
| 6,914,533 | B2 | 7/2005 | Petite |
| 7,119,676 | B1 | 10/2006 | Silverstrim et al. |
| 2003/0154262 | A1 | 8/2003 | Kaiser et al. |
| 2004/0100941 | A1* | 5/2004 | Lim et al. ...................... 370/349 |
| 2004/0235484 | A1* | 11/2004 | Korpela et al. ............... 455/446 |
| 2007/0099622 | A1* | 5/2007 | Rappaport et al. ............ 455/446 |

* cited by examiner

*Primary Examiner* — Jean Gelin
*Assistant Examiner* — Quan Hua
(74) *Attorney, Agent, or Firm* — Woods Rogers PLC; Peter E. Rosden

(57) ABSTRACT

Methods and apparatus for global wireless sensor network architecture and protocol for remote supervision, asset control and operational management based on localized clusters of autonomous sensor/supervision/operational sensor nodes capable of ad hoc interconnection with nearby nodes and connection to gateway nodes with increased network functionality. These localized cluster nodes send data to gateway nodes either directly or through multi-hop transactions. The gateway nodes are, in turn, connected to other gateway nodes and operations control centers either through wireless or wired data communications links. Utilizing the Internet for long range interconnectivity, the network is scaleable to a global level. The resulting network is based on an ad hoc mesh topology to allow flexibility in network modification and expansion and is comprised of a tiered structure defined by increasing functionality. A current application for this technology is the remote control and supervision of lighting systems for facilities and municipalities on a local, national and/or global basis from centralized regional operations centers.

6 Claims, 4 Drawing Sheets

METHOD AND APPARATUS FOR MANAGEMENT OF A GLOBAL WIRELESS SENSOR NETWORK

CROSS REFERENCE

This application claims the benefit of U.S. Provisional patent application No. 60/869,076, filed Dec. 7, 2006, which is incorporated herein by reference in its entirety.

This application is a divisional of application Ser. No. 11/687,030 filed on Mar. 16, 2007 now U.S. Pat. No. 7,983,685 which is incorporated herein by reference in its entirety.

TECHNICAL FIELD

The present invention relates to a wireless network architecture and protocol for widely distributed sensor nodes that can be expanded globally for remote supervision, asset control and operational management.

BACKGROUND OF THE INVENTION

Low data rate communication systems have spanned across many technologies including land mobile radio, cellular, satellite, point-to-point wireless and even wired POTS systems. The high cost of implementing these solutions has limited high volume, wide area deployment for low data rate solutions. The high cost is due to "last mile" implementation including controller unit, dedicated links and service fees.

The prior art communications systems for sensors that detect and track events are large and expensive so they cannot be widely distributed in a cost effective manner. Further, event detection is heavily dependent on the characteristics of the sensors attached to the radios. Further, most existing sensors are limited in detection range and can only be deployed in a limited number. Limiting the number of nodes make sensor event detection difficult, and the high cost of radio nodes makes wide deployment financially prohibitive. Recent sensor research has resulted in reducing sensor size and cost so that a global sensor network for pre- and post-event supervision and reporting is now feasible. However, these sensors need a reliable wireless network to process and distribute sensor data to central operation centers for supervision and control.

Thus, there is a need to develop cost effective sensor nodes with a reliable wireless data network for collaborative detection, location, assessment, and tracking of events. A low cost, wireless network sensor node with long battery life that is capable of being deployed in many different environments can achieve such a solution. A complete wireless sensor network includes access points, or gateways, into existing data infrastructure for reachback communications to command and control centers.

There are several issues with current wireless sensor networks which need to be addressed: scalability to provide a global network and selection of radio RF frequency and waveform. Automatic link communications of each node is critical for cost effective deployment for a global network. There is no global spectrum allocated by international regulations or standard waveform identified, so a single RF waveform solution is not feasible.

SUMMARY OF THE INVENTION

A rapidly deployable, low cost wireless communication network for sensor applications has been developed. An ad-hoc mesh network approach represents the fundamental networking topology. No fixed infrastructure is needed to be in place to support this architecture. The key difference in this approach is that each node in the network effectively "creates" the infrastructure, acts as a "micro-router," and passes data from unit to unit, to a gateway, and back to a central command location. This network provides the key aspects required for successful implementation of low cost communication operation.

This unique architecture provides scalability to >1 million nodes including a wireless radio node design based on wideband transceiver technology and software defined radio technology that can support multiple waveforms and multiple RF frequency bands.

In a preferred embodiment, the present invention provides a mechanism for a scaleable wireless sensor network having a three-tier structure of sensor nodes to detect and track events. The scaleable wireless sensor network comprises widely distributed sensor nodes as part of wireless local area networks (LAN) connected to a remote operations center via gateways with wide area network (WAN) interfaces. Each sensor node includes a wideband transceiver and software defined radio to support operation on licensed and unlicensed spectrum for LAN's using commercial wireless or proprietary protocols. The wireless LAN is deployed initially with commercial unlicensed spectrum and then can be transitioned to licensed spectrum as it becomes available.

In a preferred embodiment, as illustrated in FIG. 1, the present invention provides the best waveforms for a widely distributed sensor network comprising wireless operation for a local area network (WLAN) 101, and wireless and/or wireline operation for a wide area network (WAN) 102. The WLAN 102 provides communications between local sensor nodes 104 and a gateway node 105 that supports both the WLAN waveform and the WAN waveform. The WAN 102 provides communications from the gateway nodes 105 to a Network Operations Center 203 (FIG. 2) for command and control. The operations center collects data from all of the sensor nodes, performs an assessment and then makes decisions based on the results.

In a preferred embodiment, as illustrated in FIG. 2, the present invention includes Sensor Node Management function 205 that provides supervision, status and control that is unique to the operation of multiple WLAN 101 clusters. All standard network management functions are handled by Network Operations Center 203 and customer specific management functions are handled by Customer Management 204.

No single prior art WLAN waveform meets the spectrum availability and data link reliability necessary for a nationwide or global network. Therefore, the system and method of the present invention provide a multi-waveform sensor node that can support multiple wireless protocols for the WLAN 101 and multiple wireless and wireline protocols for the WAN 102. In a preferred embodiment, a common system and method supports multiple waveforms that are selected at installation or can be downloaded over-the-air. This provides the flexibility to use any standard waveform or proprietary waveform that fits within the design constraints of the transceiver, processor and external interfaces.

The foregoing and other features and advantages of the invention will be apparent from the following, more detailed description of preferred embodiments as illustrated in the accompanying drawings in which reference characters refer to the same parts throughout the various views.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE INVENTION

It is to be understood by persons of ordinary skill in the art that the following descriptions are provided for purposes of illustration and not for limitation. An artisan understands there are many variations that lie within the spirit of the invention and the scope of the appended claims. Unnecessary detail of known functions and operations may be omitted from the current description so as not to obscure the present invention.

The wireless sensor network of the present invention comprises multi-waveform nodes and provides low cost, low power wireless links for multiple applications including energy management, Supervisory Control and Data Acquisition (SCADA), industrial automation and similar machine-to-machine applications. In the event of a failure, locally based personnel will be the first to respond. However, coordinators lack the ability to detect, locate, assess, track, and respond to events. Therefore, coordinated and informed decisions cannot be made or communicated in a timely manner. Implementation of a real-time sensor network, according to the present invention, improves the response capabilities and speed of these limited and specialized resources. This network provides broad coordination at local, national, and global levels.

A critical component of the present invention is a wireless sensor network. Characteristics of the wireless sensor network include:
  rapid deployment;
  reliable data link operation;
  comprehensive event detection, assessment and tracking;
  automatic adjustment to multiple background environments;
  support for both pre and post-event scenarios;
  redundancy;
  data security and physical security;
  multiple sensor types;
  flexibility for different deployment scenarios;
  centralized operation for failure detection, maintenance, configuration and software upgrades; and
  integrated data transfer and communications.

Sensor Network Architecture

Figure 1:
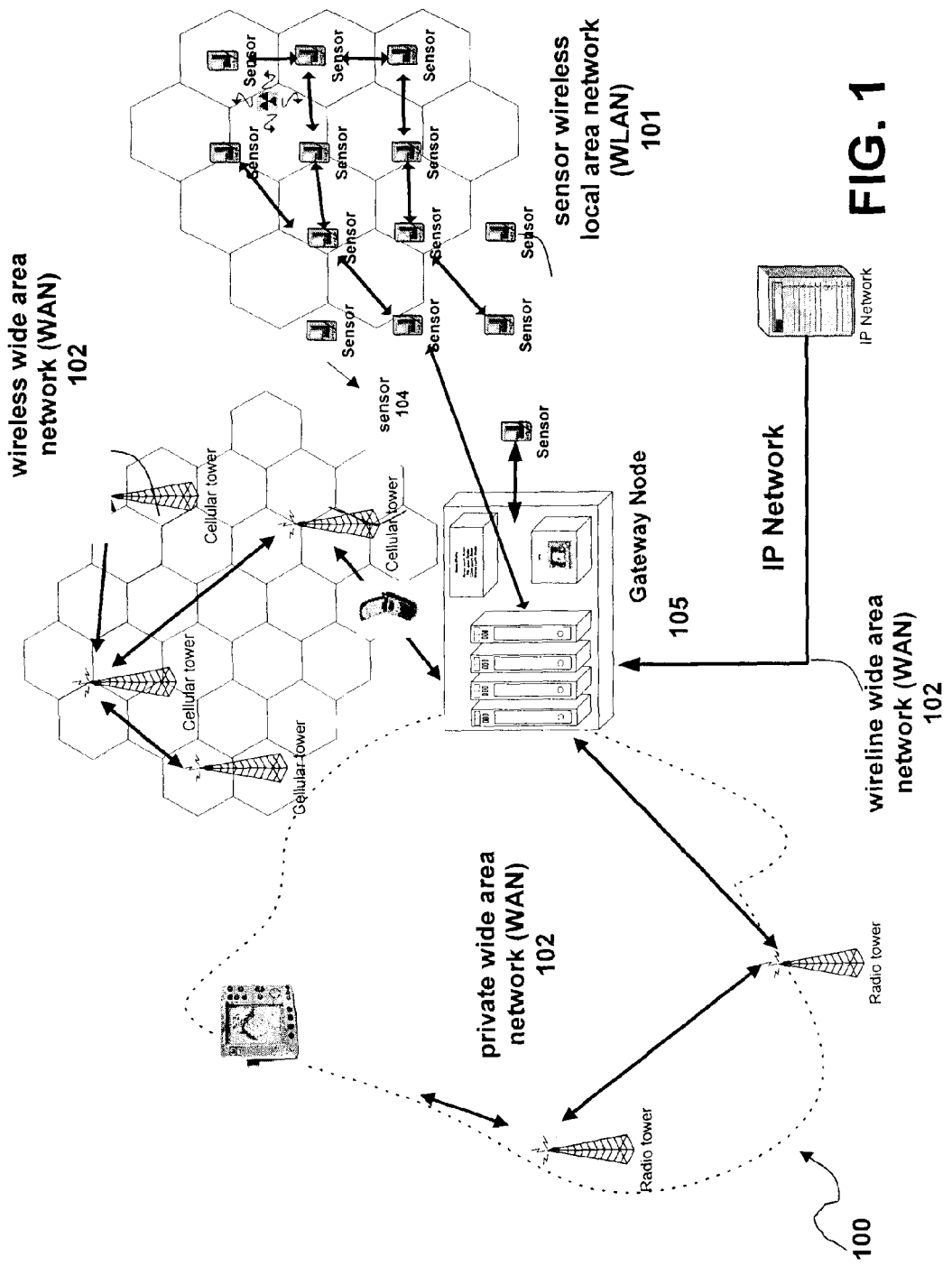
FIG. 1 illustrates the concept of sensor network deployment according to an embodiment of the present invention.

A preferred embodiment of the present invention provides a sensor network, illustrated in FIG. 1, as a flexible open architecture that serves as a communication platform for multiple deployment scenarios and sensor types. For example, wireless sensors nodes may be used to track, one or more events, such as, a lighting control sensor and/or a chemical sensor may be employed to take an air sample and measure its properties. A network according to a preferred embodiment, can be deployed to cover a whole city, high traffic choke points, high value assets, or deployed locally in rapid response emergency situations. Wireless sensors can be placed in various fixed or mobile locations. Typical fixed locations include buildings, poles/towers for power or telephone lines or cellular towers or traffic lights. The fundamental capability of the sensor network, in a preferred embodiment, is real-time operation capability. The system possesses the capability to rapidly detect, locate, characterize, report, track, and respond to events. The key aspects of this preferred embodiment are deployment flexibility of the system, seamless scalability from small to large networks, network redundancy, and low cost for dense node placement.

The gateway nodes (GWNs) 105 are distributed within the network to provide reachback links to existing public or private infrastructure types such as cellular, land mobile radio, and wired or wireless IP access points. Example standards include GSM, CDMA2000, TDMA, IEEE 802.11, IEEE 802.16, APCO Project 25, Ethernet, DOCSIS cable modems, and DSL. A GWN 105 works as both a sensor network data concentrator as well as a reachback vehicle with existing communication infrastructures (ex. land mobile radio, cellular, broadband data, etc.). In essence, it provides transparent communications across different physical layers.

In a preferred embodiment, the gateway node 105 can dynamically re-assign the primary reachback communication medium based on available services. When one network is at capacity, unavailable, or damaged, a gateway node 105 can automatically re-route information via an alternate protocol.

In a preferred embodiment, redundant local servers provide node network management functions 205 such as Dynamic Host Configuration Protocol (DHCP) for Internet Protocol (IP) address assignment, Simple Network Management Protocol (SNMP) for device control, and security through an Electronic Key Management System (EKMS). Encryption for unattended devices is limited to Type III algorithms such as the advanced encryption standard (AES). More secure encryption schemes can be applied at higher layers where aggregated data and decision information is present. Provisioning of the network bandwidth and network traffic optimization that is unique to the WLAN 101 clusters is controlled from the local server. The provisioning ensures sufficient Quality of Service (QoS) is maintained in the local network 101 such that sensor data from emergency events do not flood the available bandwidth on the reachback infrastructure system 206.

Multi-Waveform Sensor Local Area Network Architecture

Figure 2:
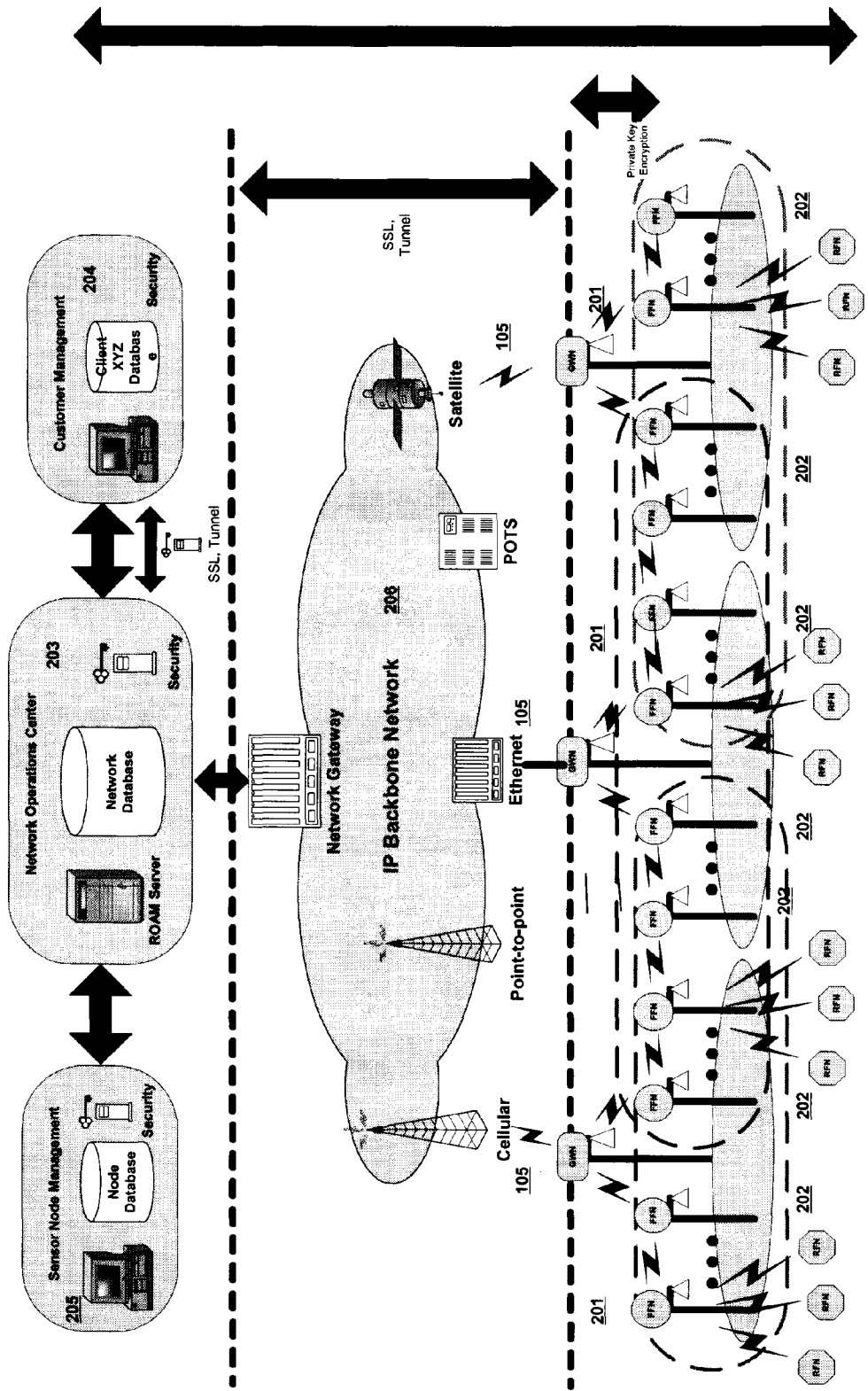
FIG. 2 illustrates a network architecture according to an embodiment of the present invention.

The system and method of the present invention provide a wireless sensor network to supply responders with event detection information, as illustrated in FIG. 1. In a preferred embodiment, three tiers of wireless sensor nodes are provided in the network, as illustrated in FIG. 2:

Gateway node 105 (GWN) supports the transfer of information between the WLAN 101 and WAN 102 infrastructure. It is a highly modular design that can be implemented as a fixed or mobile device. A GWN 105 includes all of the functions of a full function node FFN 201 (see FIG. 2) and operates from either an AC or DC power source which may further include an AC or DC power source backup.

Full function node 201 (FFN) operates on the WLAN 102. Each FFN 201 has the capability to coordinate individual piconets (subnets) within the sensor network and route data through the network to GWN 105 access points. A FFN 201 can operate from an AC or DC power source which may further include an AC or DC power source backup.

Reduced function node 202 (RFN) is an ultra-low power, low cost unit typically operating on battery power. The RFN 202 is a piconet client (or slave) with massive deployment of units operating on the WLAN 102.

In a preferred embodiment, the capabilities of the nodes are synonymous with detection characteristics of the sensors. This is part of the motivation for a three-tiered hierarchical approach. The RFN nodes 202 are deployed with a communication range that is balanced with the detection range of the sensor and desired density of the network. This achieves the necessary long battery life and low price points for RFNs 202 to support massive deployment. Sensors with more advanced detection and classification capabilities are assumed herein to be more expensive and consume more power. These advanced sensor types are coupled with the FFN 201 or GWN 105 nodes where the distribution density is lower. To save on node battery life, the sensor radio nodes are put to sleep and wakeup on event detection. The nodes may be powered by any suitable power source and may include more than one power source. For example, the nodes may be battery powered, fuel cell powered, or solar powered to directly power operation or to charge their batteries and may include a backup power source of the same or a different type.

The networked gateway node 105 provides a very flexible design for use in multiple novel scenarios such as serving as a repeater in a subway where traditional signals are not present. The concept includes mobile nodes with GWN 105 capability that move throughout the network in areas where fixed sensors are not present. Mobile sweeper nodes are included in the network to roam about providing coverage outside the core network or in areas between piconets within the network. The mobile nodes can be mounted on vehicles such as squad cars, trucks, and trains, or can be hand portable devices. The intent is for mobile nodes to register with and pass data to FFNs 201 located at fixed locations such as traffic lights. Detection events can be reported within the network or directly to the infrastructure network in the case where the mobile node has roamed beyond the fixed sensor network (i.e. a rural or suburban setting). GPS modules can be embedded within the nodes as location reference points. In a preferred embodiment, the GWN 105 is powered from commercial AC with battery backup in fixed location or DC power in mobile application. For handheld devices the batteries are rechargeable since battery life is on the order of several hours.

In a preferred embodiment, FFNs 201 are mid-tier nodes capable of operating as a piconet coordinator or client. An FFN 201 can provide multi-sensor fusion of detection data from low-tier RFN nodes 202, redundant routing of data through the network, and greater link range. FFNs 201 provide piconet (cluster) coordination or they can serve as more capable replacements for RFNs 202 within the network. The tradeoff for increased capability is increased cost, size, and power consumption. The sensor interface includes the same capabilities as RFNs 202, but these nodes can be coupled with more advanced, active sensors for event assessment and tracking. Inter-piconet communications can occur between FFNs 201 in a peer-to-peer (P2P) manner. The FFN 201 and GWN 105 nodes possess sufficient processing capabilities to perform correlation of sensor detection data thus increasing the probability of detection while decreasing the probability of false positives.

In a preferred embodiment, RFN nodes 202 are low tier, extremely low cost, small size, and low power devices. Each RFN node has a low cost, for example each RFN node has less than a $15 bill of material cost. In a preferred embodiment, these nodes are massively deployed and coupled with low cost, low power passive sensors. Use scenarios for these nodes include mobile wireless sensors for event detection, smart RFID tags to track mobile personnel and assets or rapid placement of fixed sensors for event detection and post-event tracking. All communication from RFN nodes 202 are coordinated through FFN 201 or GWN 105 nodes. This configuration forms a classic master-slave star topology for each node cluster, or piconet.

Reliable communications for a wireless sensor network are provided in a preferred embodiment by combining a reliable and secure RF physical layer with an ad-hoc networking data link layer that is self-configuring, energy efficient, and scaleable to variable size networks. The communication solution of this preferred embodiment ensures a reliable and secure RF physical layer connection;

exercises adaptable, interoperable waveforms that can satisfy many different deployment scenarios; and provides data link layer ad hoc networking that supports priority service, collaborative sensor fusion, and scalability to variable size networks.

The core communication functionality of each node type is effectively the same, but each tier progressively increases capability at the expense of increased cost and power consumption, in a preferred embodiment. The core framework layer provides a standardized technique for packaging sensor data such that it is properly interpreted at all layers of the system. The GWN nodes 105 are similar to FFN's 201 with added interface capabilities and software to support stack translation between various protocols. The core node stack follows the standard OSI model commonly found in most internet enabled devices. The key layers that require unique attention for the present invention are the physical layer, the ad-hoc link layer, and core framework layer. Choice of physical layer determines communication range, synchronization, power consumption, node cost, interference immunity (thus reliability), multipath performance, and data rate. The ad-hoc link layer controls automatic formation of the network topology, power control, and maintenance of reliable link connections within the network.

Ad-hoc networking protocols provide mechanisms for automatic configuration, rapid deployment, self-healing and redundant data routes, range extension, and energy efficient communications. The ad-hoc network passes data node to node throughout the network. This capability provides range extension and allows all fixed or mobile nodes to communicate with any other node in the network. The result is a highly redundant network with multiple routes to gateways that interface to existing infrastructure communication systems. Information is passed to decision-making centers and is also passed back for dissemination to the responders roaming within the network. This achieves a totally integrated, widely distributed supervision system that serves as a communication platform for multiple sensor types and also serves as a rapid information dissemination system. Decision information passed back through the network or through traditional response channels provides on-scene commanders the best response information. In an alternative embodiment, data can also be passed to traffic information signs, and can be used for coordination of traffic flow control.

Existing wireless ad-hoc networking with an IP network layer include the IEEE 802.11 standard and IEEE 802.15.1 (Bluetooth). Both standard technologies do an excellent job filling the role for which they were designed. However, the link protocols do not form the desired network topology to achieve an optimal deployment solution. Also, the use of unlicensed spectrum bands allows fast deployment anywhere, anytime, but may not meet reliability requirements for critical communications. These bands are not dedicated and can easily be jammed by other commercial users.

A preferred embodiment employing a software defined radio leverages advanced processing technology to effectively replace multiple radios that support specific waveforms with one radio that supports multiple waveforms. This technology is based on a wideband transceiver coupled with a programmable processor and a standard software environment such that the sensor radio can support multiple waveforms all via software control. In the absence of dedicated security spectrum, and with open physical layer questions remaining in regard to licensed spectrum availability and interference concerns in unlicensed bands, the system and method of the present invention provides an adaptable solution comprising a single hardware platform with multiple commercial waveforms in a software defined wideband RF transceiver implementation. The waveforms supported in a preferred embodiment leverage existing nationwide WAN commercial infrastructure to provide coverage in a time frame and at cost points not attainable with multiple independent solutions.

A key requirement of a reliable network solution is redundancy. Multiple data paths to decisions-making authorities are required to ensure critical communications is achieved. The network of sensor nodes of the present invention can be considered a network of micro-routers. Routing in the context of micro-routers faces many of the same challenges of traditional routers such as routing decisions, route discovery/repair, flow control, power control, etc. However, the size, battery life, throughput, and processing capabilities of a micro-router are orders of magnitude smaller than a traditional router.

Multi-Waveform Sensor Nodes

In a preferred embodiment, the wireless sensor network detects and tracks events using widely distributed sensor nodes organized as multiple ad hoc local area networks. The wireless sensor network has three types of sensor nodes
  Gateway Sensor Node (GSN) 105;
  Full Function Sensor Node (FFN) 201; and
  Reduced Function Sensor Node (RFN) 202.
The wireless sensor network typically supports data for the following WAN 102 waveforms:
  APCO Project 25 for VHF (136-174 MHz), UHF (406-512 MHz) and 700/800 (764-869 MHz);
  Cellular/PCS 800 MHz for GSM/GPRS, ANSI-95B;
  Cellular/PCS 900 MHz for GSM/GPRS, ANSI-95B;
  Cellular/PCS 1800 MHz for GSM/GPRS, ANSI-95B;
  PCS 1900 MHz for ANSI-95B, GSM/GPRS 1900, EDGE 1900, CDMA20001xRTT;
  3G Cellular Wideband CDMA
  Broadband Wireless—IEEE 802.16 and IEEE 802.20;
  IP over Satellite;
  IP over Ethernet;
  IP over Cable;
  IP over DSL; and
  iDEN (806-866 MHz).
The wireless sensor network could be adapted to future developed WAN waveforms.

The wireless sensor network supports data for the following commercial WLAN 101 waveforms and licensed WLAN 101 waveforms with variations for the ad hoc mesh:
  IEEE 802.11b/g/a;
  IEEE 802.15.1 (Bluetooth);
  IEEE 802.15.3;
  IEEE 802.15.3a (ultra wideband);
  IEEE 802.15.4;
  IEEE 802.15.4a (ultra wideband);
  4.9 GHz band for Public Safety; and
  5.9 GHz and for Intelligent Transportation System.
The wireless sensor network could be adapted to future developed WLAN waveforms.

Figure 3:
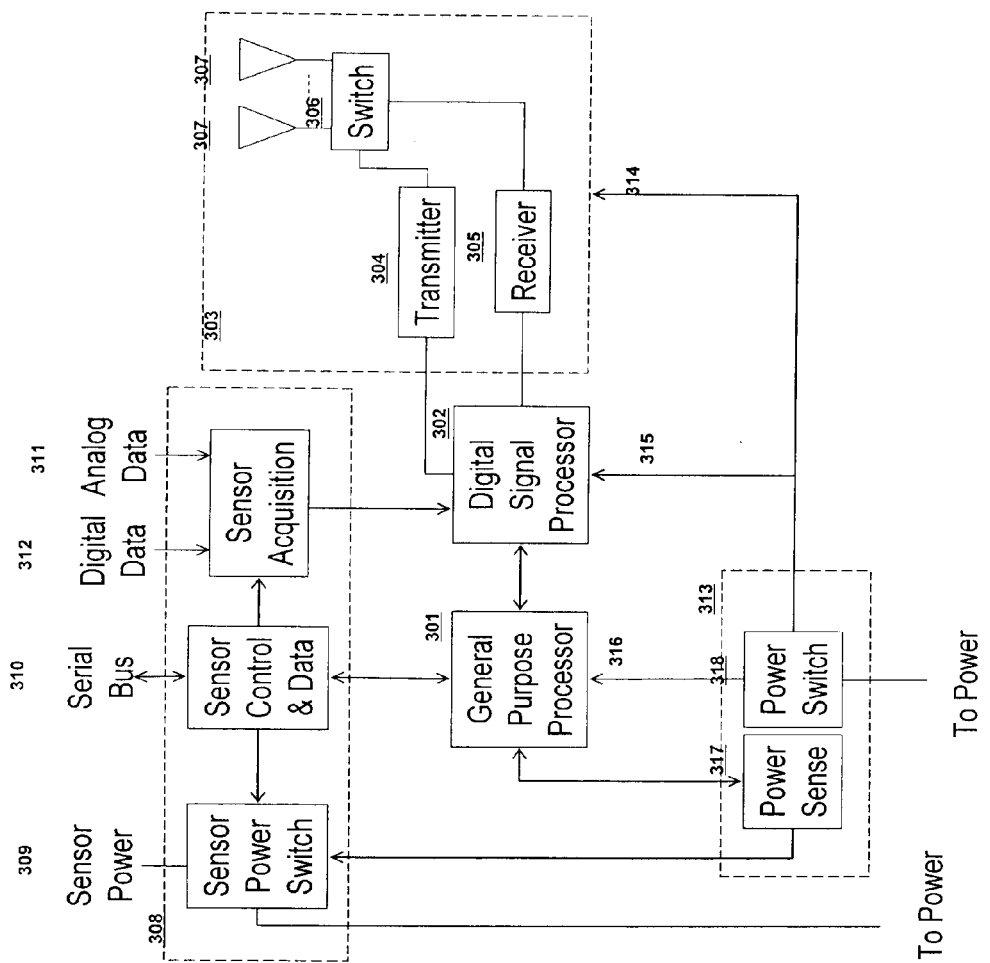
FIG. 3 illustrates a node architecture according to an embodiment of the present invention.

Each sensor node comprises an embedded processor, wideband transceiver, software defined radio and sensor interface as shown in FIG. 3. Each node processes sensor information and transfers data to an operations center via the wireless sensor network.

The main processor of the radio assembly includes a General Purpose Processor (GPP) 301 and a Digital Signal Processor (DSP) 302.

The transceiver 303 includes the transmitter 304 and receiver 305 chains, RF switch 306 and embedded antennas 307. The sensor interface 308 provides DC power 309, RS-232 serial bus 310 for control and low speed data, and a sensor acquisition interface for analog 311 and high speed digital data 312.

The power interface 313 includes power control to the transceiver 314, DSP 315 and GPP 301, and the power sensing circuit 317 that controls the processor and sensor power switches 318.

Physical interfaces are as follows:
  Power I/O includes power, ground, and temperature sensor to power interface;
  Sensor I/O includes power, ground, and serial RS-232. The actual interface will be dependent on the specific sensor; and
  Transceiver I/O includes power, ground, Tx serial data, and Rx serial data. It also includes discrete signals for reference clock, Tx/Rx, Tx power, RSSI, and AGC control.
There is a board level serial and/or Ethernet connection on the processor board for software development, debug and factory programming.

Figure 4:
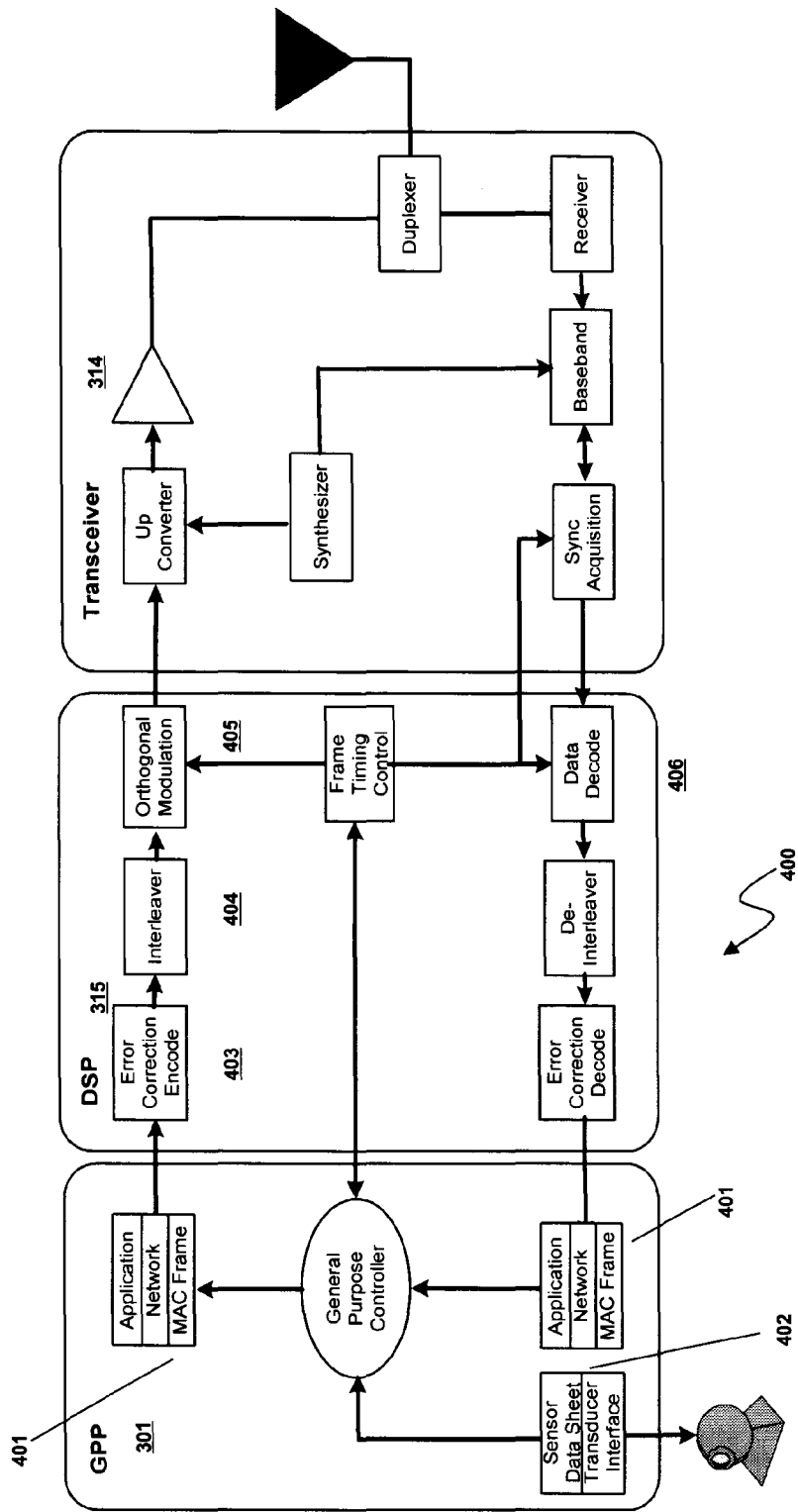
FIG. 4 illustrates a sensor node logical design according to an embodiment of the present invention.

The logical decomposition of functionality of a preferred embodiment of the present invention is illustrated in FIG. 4. The three main components of the logical architecture are the Transceiver 314, DSP 315, and General Purpose Processor (GPP) 301.

The GPP 301 is the primary controller for the sensor node. From a controller perspective it handles all power up initialization, configuration, diagnostics, and all dynamic configuration control for the sensor board. From a data processing perspective it effectively handles the MAC layer 401 processing and upper layers. Data received from the sensor comes directly to the GPP 301. The sensor application data is packaged in the appropriate data sheet format 402, stored, and transferred over a link when queried.

Processing intensive operations are handled in the DSP 315. The GPP 301 in general does the decision-making about what to do with a data frame and control the timing, whereas the DSP 315 handles the data processing algorithms, data encryption, and the assembly and parsing of the frames. Error correction codes encode 403 transmit data and correct bit errors in the received data. Interleaver 404 protect against fades by distributing adjacent bits such that burst errors do not corrupt entire words and give the forward error correction (FEC) codes a better chance of correcting the errors. The modulation block 405 provides channelization between piconets and can also be used as a spreading code. The data decode block 406 keeps frame synchronization and uses the modulation codes to perform the appropriate channel decode.

The sensor network nodes support multiple sensor types such as temperature, pressure, humidity, wind speed, voltage, current, lighting, chemical, biological, radiological, explosive, acoustic, magnetic, seismic, micro-radar motion and imaging for tracking one or more event types.

The WLAN 101 and WAN 102 waveforms support quality of service (QoS) to allow mixing of data types such as data, video and digital voice on the wireless sensor network.

All nodes interoperate with commercial equipment when operating with standard waveforms.

A GWN node 105 supports one or more instantiations of the WLAN 101 waveforms and two or more instantiations of the WAN 102 waveforms simultaneously. A GWN node 105 supports a primary and secondary WAN 102 waveform. It automatically switches to the secondary when the primary is not available. It automatically switches from the secondary to the primary when the primary is available. There is no data loss when the GWN 105 switches between the primary and secondary waveforms. Gateway sensor nodes (GWN) 105 support a network of:

nodes scattered in pseudo random fashion including GWN 105, FFN 201 and RFN 202 nodes;
Route table for IP addresses;
multiple environments including rural, desert, mountain, forest, and urban areas.
  Internet standard IPv4 and IPv6;
  standard Internet protocols including DNS and DHCP for automatic provisioning;
  Internet standard NTP for network time distribution;
  Internet standard SNMP for record-keeping, fault reporting, diagnostics, application download and configuration;
  providing the MIB II in accordance with RFC 1213 and registered with the Internet Assigned Numbers Authority (IANA) as a private enterprise MIB, structured in accordance with the Structure of Management Information (SMI) and its objects encoded with International Organization for Standardization's (ISO) Abstract Syntax Notation One (ASN.1) method using the Basic Encoding Rules (BER) to provide access to the functions and associated variables that support configuration, control, and monitor functions;
  Internet security standards for authorization, authentication, encryption, and key management;
  private key management;
  advanced encryption standard (AES) encryption standards; and
  FIP-140-1 Level 1 compliance.

GWN sensor nodes 105 include an Ethernet interface to sensors. During the loss of prime power, the GWN 105 is capable of retaining all configuration parameters stored or in operation at the time. The WLAN and WAN of the GWN 105 operate independently. A GWN node 105 operates on WAN 102 and WLAN 101 at the same time without degradation of specified performance of any operating waveform. A GWN 105 node is able to receive a GPS signal from an external GPS receiver. A GWN 105 node allows automatic retransmission and routing operations between waveforms.

An FFN node 201 supports one or more instantiations of the WLAN 101 waveforms simultaneously. A FFN node 201 operates as a client or a piconet coordinator. It operates as a client if a piconet coordinator exists within its RF range. It operates as a piconet coordinator if a piconet coordinator does not exist. It automatically switches between client and coordinator within the constraints of the corresponding WLAN 101 standard. An FFN 201 node supports a low power sleep mode as provided by each waveform protocol to conserve power. Full Function sensor nodes 201 (FFN) support a network of:

nodes scattered in pseudo random fashion including GWN 105, FFN 201 and RFN 202 nodes;
Route table for node addresses; and
multiple environments including rural, desert, mountain, forest, and urban areas.

FFN sensor nodes 201 may include an Ethernet interface to sensors. During the loss of prime power, the FFN 201 is capable of retaining all configuration parameters stored or in operation at the time. An FFN node 201 allows automatic retransmission and routing operations between waveforms.

An RFN node 202 supports one instantiation of the WLAN 101 waveforms. An RFN node 202 operates as a piconet client on the WLAN 101 waveforms. An RFN 202 node supports a low power sleep mode as provided by each waveform protocol to conserve power. Reduced Function sensor nodes 202 (RFN) supports a network of:

nodes scattered in pseudo random fashion; and
multiple environments including rural, desert, mountain, forest, and urban areas.

All nodes have enough memory to support download of a new waveform without affecting operation of current waveforms. All waveforms are down-loadable, locally and over the air, and stored in non-volatile memory.

In general, regardless of type, sensor nodes have safeguards to reduce the possibility of unintentional reprogramming and to preclude the possibility of software storage errors. The operator is notified when a local or over the air download has successfully completed or failed. Waveforms are authenticated when they are locally or over the air downloaded into a sensor node. Sensor nodes have storage capacity to store presets and configuration information for each waveform stored. Provisions are included to prevent instantiating a waveform to an improperly configured channel. The sensor node provides positive confirmation to the operator following each successful instantiation. Sensor network nodes automatically self-organize into a robust, adaptive network for the WLAN 101 waveforms identified. Sensor network nodes 100 automatically reorganize to provide a reliable network made up of unreliable sensor nodes. Sensor nodes include serial and may include USB 2.0 interface to sensors. Sensor nodes support:

automatic provisioning;
network time distribution;
record-keeping, fault reporting, diagnostics, application download and configuration;
Internet security standards for authorization, authentication, encryption, and key management;
private key management;
advanced encryption standard (AES) encryption standards;
FIP-140-1 compliance;
built-in test and diagnostics to verify operation.
amplitude, frequency, spatial and time discrimination techniques for anti-jamming;
channel configuration/reconfiguration within the specified combinations of waveforms identified;
changing a channel waveform, changing the channel operating parameters; monitor channel performance, and turning a channel on/off without affecting the operation of other waveforms; and
automatic power control to minimize interference with other nodes.

After an unexpected power loss, or operator controlled shut down, and upon restoration of power to the radio set(s), each sensor node is capable of completing a components diagnostics test and automatic recovery. A sensor node transmitter sustains no damage when the RF output port(s) is open or shorted. A sensor node allows the operator to load time manually or over-the-air. Sample rate and reporting of sensors are configurable from 1 per second to 1 per day.

Sensor Node Management

In a preferred embodiment the present invention includes a Sensor Node Management function 205 that provides supervision, status and control that is unique to operation of multiple WLAN 101 clusters. This may include such functions as Dynamic Host Configuration Protocol address assignment, Simple Network Management Protocol (SNMP) for device status and control, security through an Electronic Key Management System and over-the-air reprogramming (OTAP). Encryption for unattended devices is limited to Type III algorithms such as the advanced encryption standard (AES). The Sensor Node Management 205 includes:

- WLAN network 101 supervision to insure reliable operation of the nodes. This includes operator displays at multiple levels to provide user to drill down from the network level to the node level.
- WLAN network 101 node link and traffic supervision and reconfiguration to optimize operation of each cluster
- WLAN network 101 site planning to determine optimum location of gateway nodes based on signal strength of RF links and traffic profiles.
- node location based on geolocation algorithm
- node configuration/reconfiguration within the specified combinations of waveforms identified;
- changing a channel waveform, changing the channel operating parameters; monitor channel performance, and turning a channel on/off without affecting the operation of other waveforms; and over-the-air reprogramming
- power control to minimize interference with other nodes
- SNMP for record-keeping, fault reporting, diagnostics, application download and configuration;
- Internet security standards for authorization, authentication, encryption, and key management;
- advanced encryption standard (AES) encryption standards;
- private key management and distribution; and
- standard interface to the Network Operations Center (203) such as XML.

While the preferred embodiments of the present invention have been illustrated and described, it will be understood by those skilled in the art that various changes and modifications may be made, and equivalents may be substituted for elements thereof without departing from the true scope of the present invention. Furthermore, the functions performed by the software and geolocation algorithm referred to above may be performed by commercially available computer programs. In addition, many modifications may be made to adapt the teaching of the present invention to a particular situation without departing from its central scope. Therefore it is intended that the present invention not be limited to the particular embodiments disclosed as the best mode contemplated for carrying out the present invention, but that the present invention include all embodiments falling within the scope of the appended claims.

What is claimed is:

1. A scaleable wireless self-organizing ad hoc mesh sensor network comprising:
    a plurality of multi-waveform sensor nodes comprising gateway nodes and non-gateway nodes that are located locally to one another, wherein said sensor nodes include wireless radio and sensors to detect and track events;
    at least one wireless local area network cluster configured to establish and maintain at least one of a commercial and a proprietary ad hoc link and routing protocol that operationally connects said plurality of sensor nodes automatically,
    said sensor nodes being located in either one mobile WLAN cluster or multiple, geographically separated mobile WLAN clusters having no fixed infrastructure;
    an operations center connected to each of said gateway nodes using at least one standard wide area network protocol; and
    a central sensor node manager connected to said operations center using at least one standard wide area network protocol,
    wherein each cluster incorporates both said gateway nodes and said local non-gateway nodes,
    the local non-gateway nodes within each cluster each acting as micro-routers by passing data node-to-node through one of a plurality of possible redundant, non-predetermined multipath RF link paths to one of the gateway nodes, the one of the gateway nodes is configured to, in response to said passing data, transmit the data to said central sensor node manager and wherein further;
    some nodes are configured to be stationary while other nodes including at least one gateway node for each cluster are mobile during operation of the network, each stationary node and each mobile node in the network is configured to communicate through an alternate mesh network pathway to a target node in the cluster in response to detecting that said target node is not within line of sight of said node,
    said central sensor node manager is configured to:
    perform site planning for the network using sensor data transmitted node-to-node through at least one path to a stationary or mobile gateway node and from that gateway node to the central sensor node manager to determine the optimum location of gateway nodes for each WLAN cluster based on traffic profiles and one-way received signal strength of RF links from neighbor nodes within that cluster;
    channelize each stationary and each mobile node in each WLAN cluster in the network based on time slot allocation using sensor data transmitted node-to-node through at least one of the paths to a gateway node within each cluster and from that gateway node to the central sensor node manager;
    adjust RF power levels of stationary nodes in each WLAN cluster in the network at the central sensor node manager using sensor data transmitted node-to-node through at least one path to a stationary or mobile gateway node within each cluster and from that gateway node to the central sensor node manager so as to provide overlapping RF coverage between stationary nodes and their neighbor nodes within each WLAN cluster;
    determine the location of mobile nodes within each WLAN cluster in the network at the central sensor node manager by using a geolocation algorithm applying data transmitted node-to-node through at least one of the paths to a gateway node within each cluster and from that gateway node to the central sensor node manager; and
    configure and reconfigure parameters for all of the stationary and mobile nodes within each WLAN cluster in the network based on information provided from all of the nodes within the network using a specified combination of identified waveforms.

2. The network of claim 1, wherein said plurality of sensor node types comprises at least one selected from the group consisting of temperature sensor, pressure sensor, humidity sensor, wind speed sensor, voltage sensor, current sensor, lighting sensor, chemical sensor, biological sensor, radiological sensor, explosive sensor, acoustic sensor, magnetic sensor, seismic sensor, micro-radar motion sensor, and imaging sensor.

3. The network of claim 1, wherein each node is powered by at least one power source selected from the group consisting of AC power or DC power wherein the DC power source may be battery, solar or fuel cell or any other source of DC power.

4. A central sensor node manager for at least one network of sensors supervised at a Network Operation Center comprising:

at least one or more wireless local area network (WLAN) node clusters for each network of sensors, said at least one WLAN node cluster incorporating said network of sensors, comprising gateway nodes and non-gateway nodes that are located locally to one another, some nodes configured to be stationary while other nodes, including at least one gateway node for each cluster are mobile during operation of the network and are configured to communicate through an alternate mesh network pathway to a target node in the cluster in response to detecting that said target node is not within line of sight of said node;

a wireless local area network cluster configured to establish and maintain at least one of a commercial and a proprietary ad hoc link and routing protocol that operationally connects said network of sensors automatically, a database configured to receive and store data related to each of the WLAN clusters;

at least one server means for managing each said WLAN node cluster;

security means configured to handle encryption and key distribution for communications among WLAN clusters;

a radio interface to relay information between the sensor node manager and the Network Operation Center using at least one standard wide area network protocol; and a controller configured to:

perform site planning for the network using sensor data transmitted node-to-node through at least one path to a stationary or mobile gateway node and from that gateway node to the central sensor node manager to determine the optimum location of gateway nodes for each WLAN cluster based on traffic profiles and one-way received signal strength of RF links from neighbor nodes within that cluster;

channelize each stationary and each mobile node in each WLAN cluster in the network based on time slot allocation using sensor data transmitted node-to-node through at least one of the paths to a gateway node within each cluster and from that gateway node to the central sensor node manager;

adjust RF power levels of stationary nodes in each WLAN cluster in the network at the central sensor node manager using sensor data transmitted node-to-node through at least one path to a stationary or mobile gateway node within each cluster and from that gateway node to the central sensor node manager so as to provide overlapping RF coverage between stationary nodes and their neighbor nodes within each WLAN cluster;

determine the location of mobile nodes within each WLAN cluster in the network at the central sensor node manager by using a geolocation algorithm applying data transmitted node-to-node through at least one of the paths to a gateway node within each cluster and from that gateway node to the central sensor node manager; and configure and reconfigure parameters for all of the stationary and mobile nodes within each WLAN cluster in the network based on information provided from all of the nodes within the network using a specified combination of identified waveforms.

5. The manager of claim 4 wherein each said server means provides Dynamic Host Configuration Protocol for Internet Protocol address assignment, Simple Network Management Protocol for device control, and security through an Electronic Key Management System and further allocates network bandwidth for each said cluster.

6. The node manager of claim 4 wherein said interface is a standard XML interface.

* * * * *